United States Patent [19]
Huang et al.

[11] Patent Number: 5,989,317
[45] Date of Patent: Nov. 23, 1999

[54] METHOD AND APPARATUS FOR RECOVERING PROCESS LIQUID AND ELIMINATING TRAPPED AIR

[75] Inventors: Cheng H. Huang, Tung San County; Ray C. Wang, Hsin-Chu; Teh Y. Liu, Chin-Chu; Cheng H. Chao, Taipei, all of Taiwan

[73] Assignee: Taiwan Semiconductor Manufacturing Co., Ltd., Hsin-Chu, Taiwan

[21] Appl. No.: 08/856,125

[22] Filed: May 14, 1997

[51] Int. Cl.⁶ ..................................................... B01D 19/00
[52] U.S. Cl. .................................. 95/241; 96/155; 96/193
[58] Field of Search .............................. 55/385.1; 95/241; 96/155, 156, 193

[56] References Cited

U.S. PATENT DOCUMENTS

| | | |
|---|---|---|
| 4,935,151 | 6/1990 | Do ............................................. 96/193 |
| 5,792,237 | 8/1998 | Hung et al. ............................... 95/241 |

*Primary Examiner*—Duane S. Smith
*Attorney, Agent, or Firm*—Tung & Associates

[57] ABSTRACT

The present invention discloses a closed-loop method for recovering a process liquid and eliminating trapped air contained in the process liquid by utilizing a manual pump having generally a bellow construction for transporting the process liquid that contains trapped air back into a liquid reservoir for venting the trapped air.

20 Claims, 1 Drawing Sheet

METHOD AND APPARATUS FOR RECOVERING PROCESS LIQUID AND ELIMINATING TRAPPED AIR

FIELD OF THE INVENTION

The present invention generally relates to a method and apparatus for recovering process liquid and eliminating trapped air in the liquid and more particularly, relates to a method and apparatus for recovering liquid by a manual pump of a bellow construction and eliminating trapped air by venting a liquid reservoir for a semiconductor process fluid.

BACKGROUND OF THE INVENTION

In semiconductor processing, a semi-conducting wafer must be processed in a multiplicity of fabrication steps, i.e., as many as several hundred, in order to complete the manufacturing of an IC device. These processing steps may include etching, cleaning, deposition and various other processing procedures. A variety of chemicals, including liquids and gases must be used in the various processing steps either to etch a specific feature on the IC chip, to clean after certain processing steps, to deposit layers from reactant chemicals, or to carry out other necessary processing steps.

A variety of specialty chemicals are used for photo and metal cleaning processes. An important requirement for such speciality chemicals, i.e., photoresists, developers, spin-on glass and polyimide is the transporting and storage of the materials. In the case of a photoresist material, the photo-sensitivity and the lifetime of such a material depends on its storage temperature. It is important to maintain such materials within a specification of 5 to 20° C. for a photoresist/developer and −20 to 10° C. for spin-on glass/polyimide materials.

The transporting of these speciality chemicals, especially liquids, or the delivery from a storage reservoir (i.e., a holding tank) to a processing chamber where the liquid is used is another important aspect of the fabrication process. A process liquid, such as that of a photoresist or a developer, can normally be transported in a fluid passage such as a stainless steel tubing by electrical pump means. One of such conventional liquid delivery system for a photoresist is shown in FIG. 1.

As shown in FIG. 1, the photoresist delivery system 10 generally consists of a liquid reservoir or a holding tank 12, an electrical pump 16, a filter means 18, a needle valve 22, a manual shut-off valve 24 and a drain tank 28. The outlet 32 from the filter means 18 sprays a jet of the photoresist material onto a rotating wafer such that the wafer can be uniformly coated with a thin layer of the photoresist material. The filter means 18 (or a liquid/air separating means) is a device wherein air bubbles trapped in the photoresist solution can be separated from the solution and be released out of the system through needle valve 22. During the process when the photoresist material 14 contained in the holding tank 12 is pumped by the electrical pump 16, air bubbles can be generated and are trapped in the photoresist solution contained in the flow passage 20. When the liquid containing air bubbles passes through the flow passage 20 and enters into the filter means 18, the air bubbles are more likely separated and cumulated to the top of the filter means 18. A jet of the photoresist solution is then released from outlet 32 onto a rotating wafer 26. During normal operations, the needle valve 22 is opened slightly such that the photoresist liquid containing air bubbles can be pushed out of the filter means 18 through passage 30 and needle valve 22 into a waste drain tank 28. The flow of the waste photoresist solution can further be controlled by a manual shut-off valve 24 positioned in between the needle valve 22 and the drain tank 28.

During normal operations, a small amount of air bubbles can be purged out by the above described procedure, i.e, by leaving the needle valve 22 slightly open such that the pressure in the filter means 18 pushes out air bubbles together with a volume of the photoresist solution. However, when a large volume of air bubbles is generated, i.e., during a maintenance procedure of filter replacement or during a photoresist solution change in the holding tank 12, the filter means 18 cannot effectively exhaust the air bubbles unless a large volume of the photoresist solution is purged out and wasted. In other words, the filter means 18 is no longer effective in separating and accumulating the air bubbles when the volume of the bubbles exceeds a critical amount.

When a wafer surface is coated with a photoresist material, the volume of the photoresist material coated and the resulting photoresist film formed must be quantitatively controlled to a high accuracy. Since the presence of air bubbles in the photoresist solution decreases the amount of the photoresist, the amount of the photoresist material available for covering the wafer surface is reduced accordingly. A non-uniform coating and subsequently, a defective pattern can be produced under such circumstances. A poor coating of photoresist film and a poor patterning can result from such a defective coating process due to the presence of air bubbles.

It is therefore an object of the present invention to provide a method of recovering process liquid and eliminating trapped air from such liquid that does not have the drawbacks and shortcomings of the conventional methods.

It is another object of the present invention to provide a method for recovering process liquid and eliminating trapped air in the liquid by utilizing a manual pump to return the process liquid containing trapped air back into a liquid reservoir.

It is a further object of the present invention to provide a closed-loop method for recovering process liquid and eliminating trapped air in the liquid by utilizing a manual pump constructed mainly of a bellow structure.

It is still another object of the present invention to provide a closed-loop method for recovering process liquid and eliminating trapped air in the liquid by utilizing a manual pump that is activated only when excessive amount of trapped air is detected in the closed-loop process liquid flow system.

It is yet another object of the present invention to provide a method for recovering process liquid and eliminating trapped air in the liquid such that a waste of the process liquid can be greatly reduced due to the trapped air problem.

It is another further object of the present invention to provide an apparatus for recovering process liquid and eliminating trapped air in the liquid which consists of a bellow-type manual pump that can be operated when excessive trapped air in the liquid is detected.

SUMMARY OF THE INVENTION

In accordance with the present invention, a closed-loop method and apparatus for recovering a process liquid and eliminating trapped air in the liquid in a semiconductor fabrication process is provided.

In a preferred embodiment, a method for recovering a process liquid containing trapped air can be carried out by the steps of first providing a process liquid which contains trapped air and delivering it to a manual pump, and then manually pumping the process liquid into a liquid reservoir.

The present invention is also directed to a closed-loop method for recovering a process liquid and eliminating trapped air in the liquid by the operating steps of first providing a liquid reservoir for holding a process liquid and feeding to an electric pump, and then providing an electric pump for transporting the liquid from the reservoir to a liquid/air separating device, the liquid/air separating device is equipped with a liquid inlet and a first and a second liquid outlet, transporting a liquid that is substantially without trapped air from the first outlet to an article being processed, transporting a liquid that contains trapped air accumulated by the liquid/air separating device from the second outlet to a manual pump, and pumping the liquid that contains trapped air into the liquid reservoir and venting away the trapped air.

The present invention is further directed to an apparatus for recovering a process liquid and eliminating trapped air in the liquid which includes a liquid reservoir for holding a process liquid, a liquid transporting device capable of transporting to a liquid/air separating device, a liquid/air separating device capable of separating and outputting liquid with trapped air and liquid substantially free of trapped air, and a manual pump for pumping the liquid with trapped air into the liquid reservoir and venting the trapped air.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENTS

The present invention provides a closed-loop method for recovering a process liquid and eliminating trapped air in the liquid by using a manually operated pump.

Figure 1:
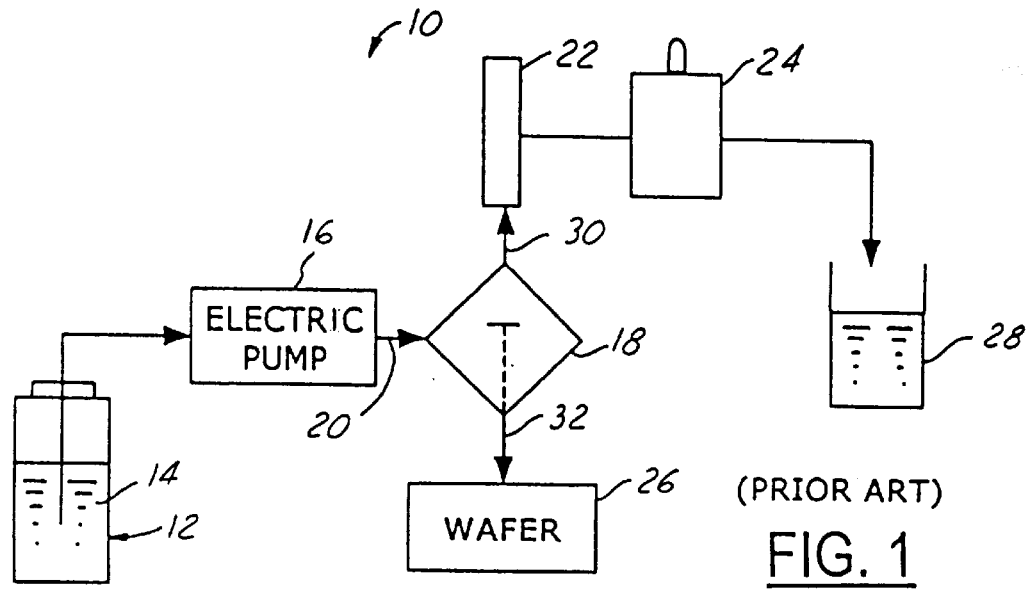
FIG. 1 is a schematic showing a conventional process liquid transporting system from a liquid reservoir to a wafer being processed and to a drain tank.
Figure 2:
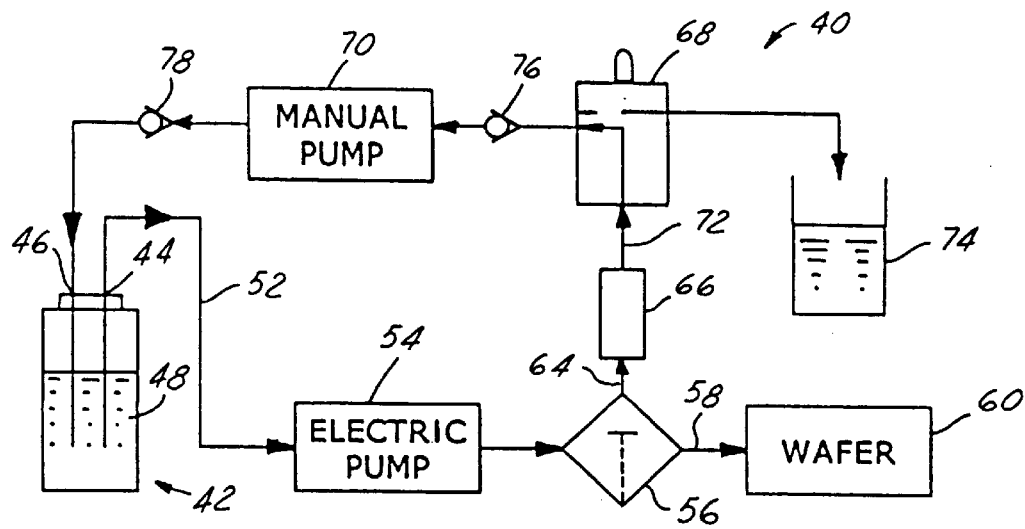
FIG. 2 is a schematic showing the present invention closed-loop recovery system for recovering process liquid and eliminating trapped air in the liquid.

Referring initially to FIG. 2, wherein a present invention closed-loop apparatus 40 for recovering a process liquid containing trapped air is shown. In the closed-loop apparatus 40, a process liquid reservoir 42 is first provided which has a liquid outlet 44 and a liquid inlet 46. The closed-loop process liquid recovering system operates in the following manner, a fresh supply of the process liquid 48 is first delivered from reservoir 42 through passageway 52 by the electric pump 54 into a filter device 56 (or a liquid/air separating device). The filter device 56 is capable of separating and accumulating air bubbles that are generated by the pumping action of the electric pump 54 and that are trapped in the process liquid. A process liquid flow 58 which is substantially air bubble free is then delivered to an article being processed. In one specific embodiment, when the process liquid 48 contained in reservoir 42 is a photoresist solution, the process liquid flow 58 is delivered in a stream directly onto a surface of wafer 60. The process liquid flow 58 is injected onto the rotating wafer 60 such that a thin, uniform photoresist film (not shown) can be formed on the wafer surface (not shown). When excessive air bubbles are present in the process liquid flow 58, which is most likely caused by a filter change or a process liquid change, the amount of the photoresist solution in the flow 58 is reduced by a corresponding amount of the air bubbles. This leads to a poor film formation which is either defective or forms a poor pattern in the subsequent patterning step. The presence of air bubbles in the process liquid flow 58 is therefore detrimental to a semiconductor process wherein a process liquid is evenly distributed on a wafer for achieving an uniform, thin film.

The present invention novel apparatus of a liquid recovery system operates by first separating and accumulating air bubbles generated by the electric pump 54 in a certain portion of the filter device 56 such that a process liquid flow 64 can be separately outputted from an output port of the filter device 56. The flow of the process liquid flow 64 which contains air bubbles can be controlled by a needle valve 66 and a manual shut-off valve 68 for delivery to a manual pump 70. The needle valve, a during normal operation of the system, is left open slightly such that there is always a constant flow of the process liquid that contains air bubbles through the needle valve 66. The manual shut-off valve 68 can be used to completely shut-off the process liquid flow or optionally, to direct the flow to a drain tank 74. During normal operations, the process liquid 72 exits the manual shut-off valve 68 and enters into the manual pump 70 through a one way flow control valve 76. The one way flow control valve 76 allows the flow of the process liquid only from the manual shut-off valve into the manual pump 70 and not in the reverse direction. A second one way flow control valve 78 can also be utilized at downstream from the manual pump 70 to insure the one way flow of the process liquid back into reservoir 72 through the inlet 46.

Figure 3A:
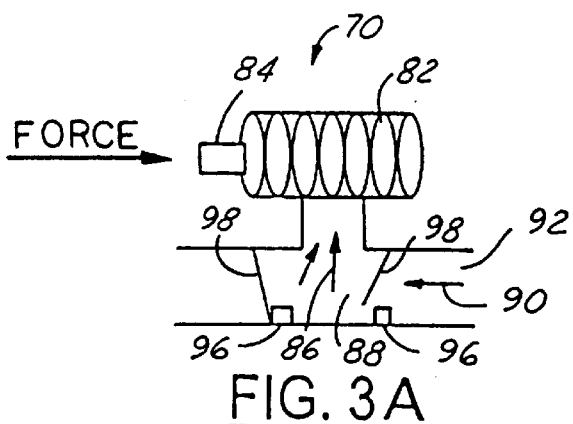
FIG. 3A is an enlarged view of the manual pump utilized in the present invention apparatus in an uncompressed state.
Figure 3B:
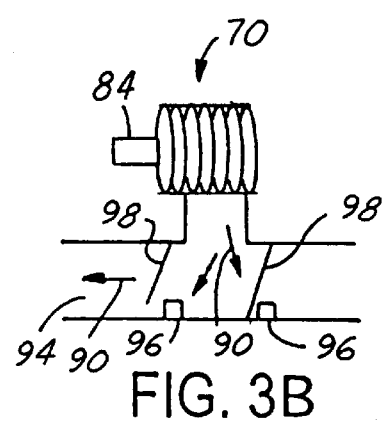
FIG. 3B is an enlarged view of the manual pump shown in FIG. 3A in a compressed state.

The manual pump 70 can be constructed in various constructions, one of which that can be conveniently used in the present invention novel apparatus is a bellow type pump shown in FIGS. 3A and 3B. As shown in FIG. 3A, the bellow 82 is in an uncompressed state equipped with a ventilation device 84. When force is applied on the bellow 82, an air flow 86 is drawn from chamber 88 such that a volume of the process liquid 90 can be pulled into channel 92. After the bellow 82 is fully compressed, as that shown in FIG. 3B, the process liquid 90 is sucked out of chamber 88 into channel 94 such that it can be sent back to the reservoir 42. The venting of the bellow is possible through the ventilation device 84 provided at the center of the bellow 82. Stops 96 are utilized to restrict the one way flow nature of the valves 98.

The present invention novel recovery system for a process liquid therefore allows a complete recovery of the process liquid that contains air bubbles back into a liquid reservoir. The process liquid containing the air bubbles is then vented in the reservoir to eliminate the air bubbles. The venting process can be accelerated by applying a slight negative pressure in the air chamber 38 of the reservoir 42. The present invention novel apparatus greatly reduces the waste of a process liquid used in a semiconductor fabrication process. Furthermore, the manual pump 70 shown in FIG. 2 can be operated only as needed, normally at a frequency of a few strokes when the air bubble concentration in the liquid flow system reaches a threshold amount as determined by the machine operator.

It should be noted that while the present invention apparatus shown in FIG. 2 is illustrated by utilizing a photoresist solution, the apparatus can be used for any other liquid materials that are normally employed in any chemical processes or in any semiconductor fabrication processes.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. A method for recovering liquid containing trapped air comprising the steps of:

providing a liquid containing trapped air and delivering it to a manual pump, and manually pumping said liquid into a reservoir.

2. A method according to claim 1, wherein said liquid containing trapped air is first collected in a liquid/air separating device.

3. A method according to claim 2, wherein said liquid/air separating device is a filter device.

4. A method according to claim 1 further comprising at least one one-way valve positioned upstream or downstream from said manual pump.

5. A method according to claim 1 further comprising two one-way valves positioned upstream and downstream of the manual pump, respectively.

6. A method according to claim 1, wherein said manual pump comprises a bellow.

7. A method according to claim 1, wherein said method is used in semiconductor fabrication processes.

8. A method according to claim 1, wherein said liquid pumped is a photoresist solution.

9. A closed-loop method for recovering liquid and eliminating trapped air in said liquid comprising the steps of:

providing a liquid reservoir for holding a process liquid and feeding to an electric pump, providing an electric pump for transporting said liquid from said reservoir to a liquid/air separating device, said liquid/air separating device being equipped with a liquid inlet and a first and a second liquid outlet, transporting a liquid that is substantially without trapped air from said first outlet to an article being processed, transporting a liquid that contains trapped air accumulated by said liquid/air separating device from said second outlet to a manual pump, and pumping said liquid that contains trapped air into said liquid reservoir and venting away said trapped air.

10. A closed-loop method according to claim 9, wherein said liquid/air separating device is a filter device.

11. A closed-loop method according to claim 9 further comprising at least one one-way valve positioned upstream or downstream from said manual pump.

12. A closed-loop method according to claim 9, wherein said manual pump is generally of a bellow construction.

13. A closed-loop method according to claim 9, wherein said manual pump comprises a bellow capable of generating a suction force on a liquid when the bellow recovers from a compressed state to an uncompressed state.

14. A closed-loop method according to claim 9, wherein said process liquid held by said liquid reservoir is a photoresist solution.

15. A closed-loop method according to claim 9, wherein said method is used in semiconductor fabrication processes.

16. An apparatus for recovering liquid and eliminating trapped air in said liquid comprising:

a liquid reservoir for holding a process liquid, a liquid transporting means capable of transporting the liquid to a liquid-air separating device, a liquid/air separating device capable of separating and outputting liquid with trapped air and liquid substantially free of trapped air, and a manual pump for pumping said liquid with trapped air into said liquid reservoir and venting said trapped air.

17. An apparatus according to claim 16, wherein said apparatus is a closed-loop process liquid circulating device.

18. An apparatus according to claim 16, wherein said manual pump comprises a bellow.

19. An apparatus according to claim 16, wherein said manual pump is capable of producing a liquid suction by the compression/decompression action performed on a bellow.

20. An apparatus according to claim 16, wherein said process liquid is a photoresist solution used in semiconductor fabrication processes.

* * * * *